(12) United States Patent
Ehrfeld et al.

(10) Patent No.: US 7,934,865 B2
(45) Date of Patent: May 3, 2011

(54) MICROMIXER (75) Inventors: Wolfgang Ehrfeld, Mainz (DE); Frank Herbstritt, Alzey (DE); Till Merkel, Neu-Ulm (DE)

(73) Assignee: Ehrfeld Mikrotechnik BTS GmbH, Wendelsheim (DE)

( * ) Notice: Subject to any disclaimer, the term of this patent is extended or adjusted under 35 U.S.C. 154(b) by 963 days.

(21) Appl. No.: 10/587,404

(22) PCT Filed: Feb. 8, 2005

(86) PCT No.: PCT/EP2005/001227
§ 371 (c)(1),
(2), (4) Date: May 24, 2007

(87) PCT Pub. No.: WO2005/079964
PCT Pub. Date: Sep. 1, 2005

(65) Prior Publication Data
US 2007/0291581 A1 Dec. 20, 2007

(30) Foreign Application Priority Data

Feb. 17, 2004 (EP) .................................... 04003471
Jan. 27, 2005 (DE) ......................... 10 2005 003 965

(51) Int. Cl.
*B01F 5/06* (2006.01)
(52) U.S. Cl. ................. 366/162.4; 366/162.5; 366/182.4
(58) Field of Classification Search ............... 366/162.4, 366/162.5, 182.4
See application file for complete search history.

(56) References Cited

U.S. PATENT DOCUMENTS

| 154,544 | A | * | 9/1874 | Doten ........................ 366/167.1 |
| 401,021 | A | * | 4/1889 | Fellowes ....................... 239/428 |
| 3,540,474 | A | | 11/1970 | Sharples |
| 4,051,769 | A | * | 10/1977 | Nickerson et al. ............ 454/361 |
| 4,106,522 | A | | 8/1978 | Manesse |
| 5,372,283 | A | | 12/1994 | Schmitkons et al. |
| 5,874,644 | A | | 2/1999 | Gammill |
| 2001/0055242 | A1 | * | 12/2001 | Deshmukh et al. ........... 366/341 |
| 2002/0014179 | A1 | | 2/2002 | Nickel et al. |
| 2002/0078993 | A1 | | 6/2002 | Collado et al. |
| 2002/0081222 | A1 | | 6/2002 | Karp |
| 2002/0128416 | A1 | | 9/2002 | Marcarian et al. |
| 2003/0015194 | A1 | | 1/2003 | Schiewe et al. |
| 2003/0075101 | A1 | | 4/2003 | Weigl et al. |
| 2003/0107946 | A1 | | 6/2003 | Cosby et al. |
| 2003/0175947 | A1 | * | 9/2003 | Liu et al. .................... 435/288.5 |
| 2004/0008572 | A1 | * | 1/2004 | Stuart ........................ 366/162.4 |
| 2004/0241865 | A1 | | 12/2004 | Gabski et al. |
| 2005/0047967 | A1 | * | 3/2005 | Chuang et al. ................ 422/100 |
| 2005/0255003 | A1 | * | 11/2005 | Summersgill et al. ........ 422/100 |

(Continued)

FOREIGN PATENT DOCUMENTS

DE 19 851 253 A1 5/2000

(Continued)

*Primary Examiner* — David L Sorkin
(74) *Attorney, Agent, or Firm* — Norris McLaughlin & Marcus PA (57) ABSTRACT

Micromixer for mixing at least two fluids that react to form precipitations or suspensions, comprising a first channel for supplying a first partial flow and a second channel for supplying a second partial flow, which flows enter into a mixing and reaction area via narrow entrance gaps and leave via an outlet channel with reverse flow prevention being placed between the mixing and reaction zone and at least one channel that supplies a partial flow.

12 Claims, 12 Drawing Sheets

U.S. PATENT DOCUMENTS

2006/0087917 A1  4/2006  Ehrfeld et al.
2007/0291581 A1  12/2007  Ehrfeld et al.

FOREIGN PATENT DOCUMENTS

| | | |
|---|---|---|
| DE | 10 031 558 A1 | 1/2002 |
| DE | 10 119 718 A1 | 10/2002 |
| DE | 20 218 972 U1 | 2/2003 |
| DE | 10 143 189 A1 | 3/2003 |
| DE | 10 148 615 A1 | 4/2003 |
| EP | 1 165 224 A1 | 9/2002 |
| EP | 0 913 187 B1 | 1/2003 |
| EP | 1718402 | 11/2006 |
| JP | 7504847 | 6/1995 |
| WO | 00/61275 A2 | 10/2000 |
| WO | 01/62371 A2 | 8/2001 |

* cited by examiner

MICROMIXER

This application is a 371 of PCT/EP2005/001227, filed Feb. 8, 2005, which claims foreign priority benefit under 35 U.S.C. §119 of the German Patent Application No. 10 2005 003 965.0 filed Jan. 27, 2005, and European Patent Application No. 04003471.2 filed Feb. 17, 2004.

The invention relates to a micromixer for mixing at least two fluids which react to form precipitates or suspensions.

The use of microstructured components in apparatus for mixing fluids achieves advantages in production quality and reduces the mixing times and size of the apparatus required, compared to conventional constructs. An essential feature of microstructured components is the small dimensions of the fluid channels, which typically lie in the range of between 10 and 5000 μm. For this reason, for example with multi-lamination mixers, it is possible to generate fine fluid lamellae between which rapid substance exchange can take place by diffusion owing to their small thickness. The small dimensions of the flow-carrying cross sections, however, demand special measures in order to protect them against deposits and clogging during operation. Particle filters are fitted in the delivery of such components, for example, the selection of the cut-off limit being adapted to the dimensions of the microstructure.

Other than because of particles which can enter a micromixer via the supply channels for the inflowing medium, there is also a risk of deposits and clogging owing to chemical-physical processes which take place in the components, for instance after mixing. For example, solid products may be formed by precipitation as a result of a neutralization reaction, by exceeding the solubility product or by crystallization of the reaction product during reaction of organic or inorganic compounds. DE 101 48 615 A1 discloses a method for carrying out chemical processes, in which two fluids that react to form precipitates or suspensions are brought together in a micromixer comprising fluid channels. In order to prevent clogging of the micromixer, the at least two fluids are introduced into a mixing chamber or reaction section while being separated from one another by a further separating fluid. Premature reaction of the fluids is thereby avoided and delayed until a noncritical region of a mixer device. Another way of avoiding deposits and clogging in the microstructures is described in DE 202 18 972 U1. There, the components of a static lamination micromixer are designed so that they are readily accessible and easy to clean. Suspensions can still be handled straightforwardly in microstructured components, with clogging being prevented, if the dimensions of the microstructures are significantly greater than the maximum occurring particle dimensions. In connection with methods for packaging organic pigments, it is therefore recommended in DE 100 31 558 A1 to dimension the microstructured regions inside a reactor so that the smallest internal width of the microstructures is advantageously about ten times greater than the diameters of the largest particles. This also increases the characteristic dimensions of the components, however, so that these are often referred to as minireactors instead of microreactors. Even though these measures may provide assistance with respect to the risk of clogging, they also often reduce the utility offered by the microstructures for process control and product quality. In any event, dead volumes and sharp deviations in the wall should be avoided in order to avoid deposits in the outflow zone of a mixer or reactor. If clogging nevertheless takes place, then active cleaning measures can provide assistance. DE 101 43 189 A1 describes a method and a device for cleaning micro- and minireactors alongside the process. The micro- or minireactor is cleaned cyclically or with the aid of a controller by a controlled pressure increase with a subsequent abrupt relaxation or by a gas pressure impulse. Wall deposition which, for example, has been formed from solids involved in the chemical synthesis or physical process, is thus removed almost completely. In addition or as an alternative to such cleaning methods, particular design measures and special types of process control are also known which prevent the formation of wall deposits and clogging of the microstructured components. As already mentioned above, the use of a separating fluid is known from DE 101 48 615 A1. The separating fluid, however, may detrimentally affect the reaction by leading to dilution of a single-phase mixture and reducing the supersaturation for precipitation reactions, and therefore the yield of the reaction. Furthermore, such a separating fluid must subsequently be removed from the product flow. DE 101 19 718 A1 describes a structure for preparing inhalable pharmaceutical compositions, which consists of a micromixer, a segmenter and a subsequent holding section. For example, two liquid components are mixed in the micromixer and distributed into individual units in the segmenter, the individual units being separated from one another by another phase. This two-phase system is then heated in a holding section in order to induce the reaction which leads to formation of the solid. Segmentation of the reacting phase in this case prevents the formation of sizable aggregates. It is furthermore known to use flow effects in order to generate small solid units. For instance, EP 1 165 224 B1 describes another way in which at least two liquid media are fired at each other from micronozzles in a thin jet at a high pressure. Fine droplets are thereby generated at the collision point, in which physicochemical reactions then take place and whose size also determines the size of the solid reaction products. These are discharged by an auxiliary flow, which may be a gas or a liquid, and which subsequently needs to be removed. DE 198 51 253 A1 describes the preparation of bisphenol A by using controlled turbulence. The turbulence is generated by suitable flow control and can be used to adjust the shape and size of the particles. EP 0 913 187 B1 describes a method for continuous polymerization with a micromixer for reaction liquids. In order to produce polymers there, two or more monomers are sprayed from nozzles and brought together in one or more steps. The mixtures are then conveyed out of the mixing chamber by means of pressure. The point where two fluid jets strike each other lies at a short distance from the nozzles by which the fluids are sprayed onto each other at an angle, so that clogging of the nozzles can be prevented. WO 01/62374 A2 describes a method for producing nanosuspensions. In this case, after they are mixed in a mixing chamber, the fluids enter a nozzle which they leave via an outflow channel. The mixing is achieved by turbulence, so that deposits and clogging of the microstructures are thereby prevented.

In summary, it may be stated that the previously used solutions consist in the following measures against deposits and clogging of the microstructures: The components of the microstructures are designed so that they are readily accessible and easy to clean, they are also made much bigger than the particles, holding sections and additional channels for auxiliary flows may furthermore be provided. The methods for avoiding deposits and clogging in microreactors propose cleaning alongside the process, suitable flow controls, mixing far from the supply channels or generation of turbulence. A feature common to all the measures is that they compromise the efficiency of the microreactors or entail large additional outlay.

It is an object of the present invention to provide a micromixer for mixing at least two fluids, which ensures rapid and efficient mixing of the fluids and at the same time has good resistance to undesired deposits and clogging in the microstructures.

The object is surprisingly achieved by the micromixer according to the invention.

The invention therefore relates to micromixers for mixing at least two fluids which react to form precipitates or suspensions, having a first channel for supplying a first sub-flow (6) and having a second channel for supplying a second sub-flow (7), which open in flat, preferably narrow entry gaps (19, 20) into a mixing and reaction zone (10) and leave the mixing and reaction zone (10) via an outlet channel (11), characterized in that a reflux barrier (9, 17) is arranged between the mixing and reaction zone (10) and at least one channel for supplying a sub-flow (6, 7, 37). One of the entry gaps preferably has a reflux barrier formed in the region where it opens into the reaction zone.

The micromixer according to the invention for mixing at least two fluids which react to form precipitates or suspensions has a first channel for supplying a first sub-flow and a second channel for supplying a second sub-flow. Both channels preferably open in narrow entry gaps into a mixing and reaction zone and leave it via an outlet channel. A reflux barrier is arranged between the mixing and reaction zone and at least one channel for supplying a sub-flow. It is found to be an advantage of the micromixer according to the invention that no reflux flows occur in the mixing and reaction zone. This avoids the concomitant precipitation reactions in the inlet regions of the mixing and reaction zone. The primary nucleation for the subsequently occurring precipitations and crystallization processes takes place in the mixing and reaction zone. In order to produce finely disperse solids, as occur in precipitation or suspensions, it is necessary to achieve high nucleation rates. In industrial processes, high shear rates are therefore produced in corresponding mixing and reaction zones by rapid flows or intensive stirring. High nucleation rates can be achieved with the aid of microstructured components when fine fluid jets are injected into a flowing fluid. The fluids supplied may themselves already contain particles.

Advantageous embodiments of the micromixer are the subject-matter of the dependent claims.

Uniform growth of seeds that are formed to give a consistent particle size requires that the mixing and reaction zone be followed by a uniform flow field with low speeds. This is advantageously produced by an outlet channel with a smooth and widening geometry.

The reflux barrier of the micromixer is preferably designed as a non-return valve or as a membrane arrangement. The prestress of the spring of the non-return valve may be adjusted with the aid of mechanical means. In a particularly advantageous embodiment, the spring prestress and/or the spring constant and therefore the response pressure or the opening behavior of the non-return valve are externally adjusted during operation of the mixer. Particularly when the non-return valve is incorporated into an external control loop, it proves advantageous to use electrical, pneumatic, hydraulic or electromagnetic drives for the non-return valve.

In another advantageous embodiment of the mixer, the width of at least one of the inlet gaps and/or the characteristic dimensions of the mixing and reaction zone can be adjusted continuously or step-wise. The adjustment of these quantities may be carried out using a mechanical, pneumatic, hydraulic, piezoelectric, electrostatic or electromagnetic drive. In a particularly advantageous embodiment of the mixer, these quantities can furthermore be incorporated as control variables into a control loop.

Preferably chemical or physical properties of the mixing or reaction product are employed as control variables for adjusting the response pressure or opening behavior of the non-return valve, the width of at least one of the entry gaps and/or the characteristic dimension of the mixing and reaction zone, particularly ones which can be determined by a rapid online measurement, for example temperature, color, light scattering or absorption behavior, pH or electrical conductance.

Figure 8:
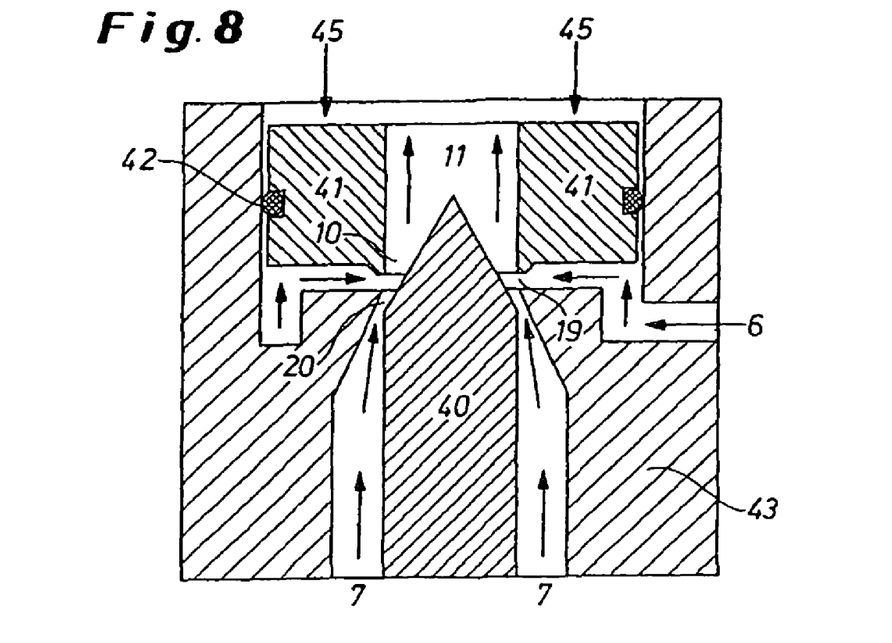
FIG. 8 shows a valve mixer with an outwardly lying non-return valve.

The entry gaps for the various sub-flows may be arranged linearly—in which case preferably also parallel—or radially, or in a curved fashion—in which case preferably annularly concentrically or axially in sequence. Linearly arranged entry gaps are particularly advantageously suitable for producing micromixers according to the invention for high volume flows, for example more than a few hundred 1/h. In the case of a likewise advantageous annular concentric arrangement, the reflux barriers may be both a component of the inner and/or outer channel. The functionality of the mixer is described in FIGS. 1 to 5 for the case in which the non-return valve is a component of the inner channel. The functionality of the mixer is described in FIG. 6 in the case of another advantageous embodiment with two annular entry gaps provided with membrane valves as reflux barriers in an axial arrangement. The likewise advantageous case of a non-return valve formed in the outer entry gap is represented in FIG. 8.

Figure 9:
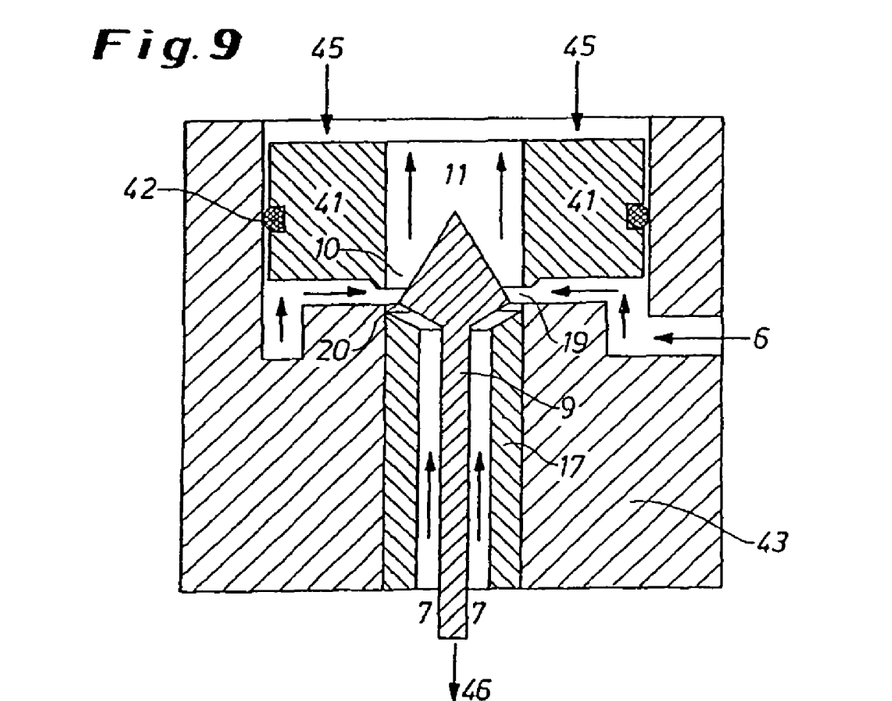
FIG. 9 shows a valve mixer with an outwardly lying non-return valve and an inwardly lying non-return valve.
Figure 10:
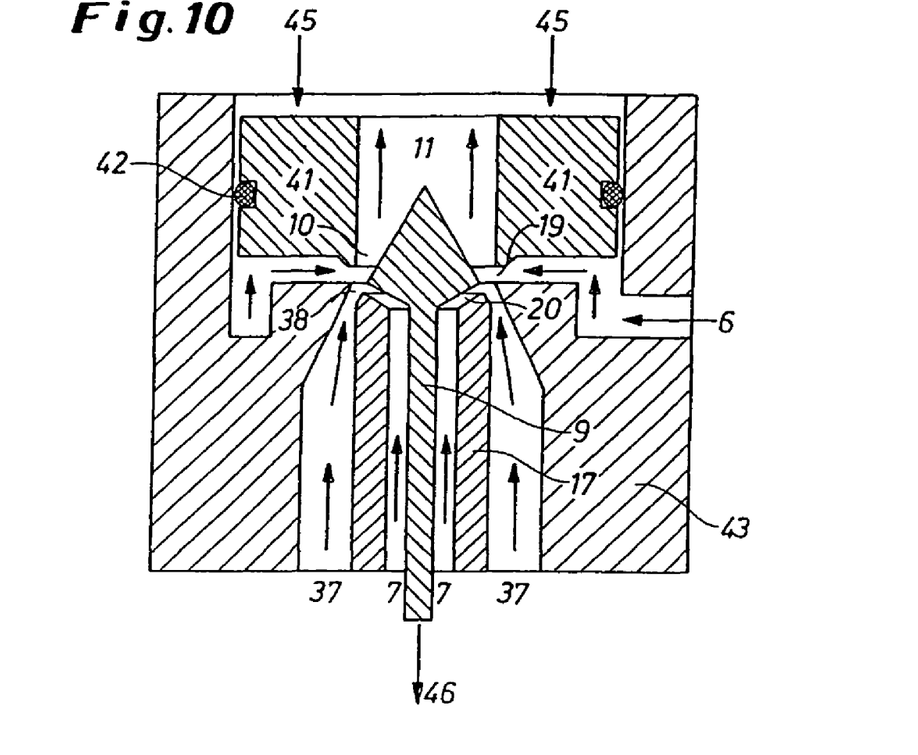
FIG. 10 shows a valve mixer with an inwardly lying non-return valve and an outwardly lying non-return valve, which has formed an additional flow channel and entry gap for supplying a further sub-flow.

In another preferred embodiment of the invention, the micromixer consists of at least one inwardly lying non-return valve and one outwardly lying non-return valve, see FIG. 9. The embodiment of the invention as represented in FIG. 10 also makes it possible to mix more than two components.

The supply for flows entering the mixing and reaction zone may be spread out in various ways by a corresponding configuration of the flow control, which increases the mixing rate and therefore the nucleation rate. Plates provided with slots, for example plates (16) provided with radial slots, which divide the sub-flow or sub-flows into a multiplicity of substreams, are fitted in a preferred embodiment of the invention as represented in FIGS. 1*d*, 2*b*, 3*a* and 3*b*. In another embodiment of the invention, particular structures, for example corrugation, are applied onto the channel walls or, as represented in FIG. 4, onto the edge of the non-return valve directly in the inflow region of the respective sub-flow.

In another advantageous embodiment of the micromixer according to the invention, the reflux barrier is electrically, pneumatically, hydraulically or electromagnetically drivable. An embodiment in which the reflux barrier can be moved periodically at a high frequency by an outer exciter is in this case particularly advantageous. Design as a non-return valve with a lightweight valve disk and periodic excitation by a piezo-oscillator or electromagnet is particularly preferred here. Frequencies in the megahertz range are particularly preferred as excitation frequencies.

For using the mixer according to the invention with high volume throughputs of the incoming sub-flows, it is preferable to use a mixer unit consisting of a plurality of parallel-operated identical arrangements of entry gaps respectively with separate reflux barriers and mixing zones in a common housing and with a common fluid supply; the fluid supply to the individual arrangements is preferably configured, and the opening pressures of the individual reflux barriers are matched to one another, so that the same mixing and flow conditions prevail in all the mixing zones of the mixer unit during operation.

The micromixer according to the invention is preferably produced by methods of precision engineering and microfabrication technology. This covers all conventional methods, for example material-removing processing, spark erosion or material processing with laser radiation. If a non-return valve is used as the reflux barrier, then its sealing effect is advantageously achieved by fitting an elastomer seal. In another advantageous embodiment, the sealing effect of the non-return valve is achieved by grinding the valve cone into its seat. This form of sealing is particularly advantageously suitable when the mixer is intended to be used at high temperatures.

The micromixer may advantageously be made from the materials customary in process technology, such as stainless steels, nickel-based alloys, titanium or tantalum. Particularly when the micromixer is used at high temperatures or with corrosive media, however, it is also preferable to use ceramic materials such as, for example, aluminum oxide, zirconium oxide, silicon nitride, aluminum nitride or silicon carbide.

The microreactors according to the invention are preferably used for crystallization and precipitation reactions.

When substances that spontaneously crystallize enter the micromixer, it is expedient to provide the reflux barriers with cleaning pins, which preferably have a needle-like tip. The cleaning pins remove any deposits from the microstructures during each opening and closing process. The cleaning pins may be inserted into a relevant outlet opening counter to the flow direction or in the flow direction. It proves particularly advantageous for any deposits to be pressed out by the cleaning pins in the flow direction. Deposits may also be removed from the microstructures in the course of operation with the aid of the cleaning pins by briefly actuating the reflux barriers. Operation does not need to be interrupted for this. The brief closing for cleaning purposes may be initiated manually, via deliberately applied pressure variations or via an external control loop.

The sub-flows may be supplied in a circular or annular cross section at a high pressure and from fine nozzles. Since crystallization processes which are influenced by the shear gradients take place in the various phases, it is advantageous for the sub-flows to meet one another at various angles in order to produce different velocity gradients between the sub-flows. The sub-flows preferably meet one another at an angle of between 5 and 175°. If the sub-flows meet one another at acute angles, then a principal component of their motion points in the outflow direction so that the relative velocities of the individual sub-flows slowly approach one another. In this way, high shear gradients can be produced at the injection point in order to favor the nucleation. The subsequent reduction of the relative velocities has a favorable effect on the crystal growth. If one sub-flow is injected at a right angle then it is possible to produce high velocity gradients in the vicinity of the dosing point, which results in a high nucleation rate. A first sub-flow can subsequently be moved through a second sub-flow in the outflow direction, the relative velocity between the sub-flows being reduced. The nucleation rate can be further increased if the injection takes place at an obtuse angle, for example 175°. In this case, the greatest velocity gradients occur at the injection point.

Crystallization and precipitation products need further treatment in many cases, for example in order to regulate the pH in the product flow by subsequently adding an acid or an alkali or in order to control the crystal size with the aid of inhibitors or stabilizers. Further dosing points are often necessary for this. These may be produced in one or more successively connected apparatus. In this context, it may also be necessary for the inflowing media, an entire component, the mixing and reaction zone or other subsequent components to be thermally regulated in a controlled way.

It is possible to influence the particle size of the crystallization or precipitation products which are formed by rendering the cross section of the outlet channel regular or irregular. Owing to their different density from the medium, the precipitation products usually move at a slower speed than the flowing liquid. Acceleration of the flow takes place at a constriction, and the flow slows down at a widening. In this way, it is possible to deliberately apply velocity gradients which cause breakdown or enlargement of large aggregates.

Precipitation and crystallization products are inclined to deposit on the walls of the micromixer as a function of their properties, the wall roughness and the flow conditions. It therefore proves favorable to enclose the outflowing products in the outlet channel in an envelope stream, which is delivered as a closed film between the wall of the outlet channel and the outflowing product.

In another advantageous embodiment of the micromixer, it is made from a material particularly resistant to adhesions in the region of the outlet channel, for example PTFE, the wall of the outlet channel is coated with such a material and/or the surface of this wall is rendered particularly smooth, for example by the use of polishing or an electropolishing method.

In order to generate particles or nanoparticles, at least one of the sub-flows supplied to the mixer is preferably a liquid, a gas, a condensed gas, a supercritical solvent, a mist, a gas with solid, optionally catalytically active components or an emulsion, or a medium which forms in the mixer as a result of the processes taking place in the mixing zone.

For precipitation reactions, for example, the reaction may be interrupted by supplying a further flow or further layers of other solids may be applied onto particles generated by the precipitation.

In this way, the mixer is advantageously suitable inter alia for generating particles or nanoparticles with a plurality of layers of different substances arranged in a concentric sequence. In order to influence the particle size and for the purpose of transferring the generated particles into another fluid phase, surface-active substances may furthermore be supplied to the product flow.

The mixer according to the invention also makes it possible to produce nanoparticles in the gas phase, in which case at least one of the supplied sub-flows may already contain finely distributed particles such as, for example, nanoparticles with catalytic action. In this way, for example, the mixer can advantageously be used in order for gaseous hydrocarbons supplemented with catalytically active nanoparticles to be mixed with ammonia gas, so as to generate particle nanotubes by chemical reaction of the mixture generated in this way.

The mixer can furthermore advantageously be used for the in-situ production of emulsions, which consequently can then also be used for carrying out precipitation and crystallization reactions and for the production of nanoparticles, if they are very unstable.

Another advantageous use of the mixer consists in the precipitation or crystallization of particles by using supercritical solvent as well as highly compressed or condensed gases, since the micromixer particularly advantageously makes it possible to operate at high pressures. In the case of such a use, the mixing product may advantageously be cooled downstream behind the mixer by adiabatic expansion of the carrier medium. Such cooling can be carried out very rapidly and thereby advantageously induce rapid nucleation, or the chemical reaction or further particle growth may be terminated very shortly after onset of the particle growth.

These uses are likewise the subject-matter of the invention.

For more complex, for example multi-stage reactions, the mixer according to the invention may also be combined with further components which are necessary for the construction of a microreaction system, for example heat exchangers, electrical heating modules (27), thermal insulators (25), further dosing points (26) or mixers capable of carrying flow, for example envelope flow mixers, control units etc. as well as measuring instruments, for example in order to determine temperatures, pressures, pH, electrical or optical properties of the substances flowing through. Particularly downstream of the micromixer, it is preferable to use those components which are not clogged or otherwise compromised in their function by the particles generated in the mixer and/or can be removed and cleaned with little outlay.

Dosing points arranged downstream behind the mixer may also be used for thermally regulating the product flow, by supplying a suitably thermally regulated liquid to it.

The micromixer according to the invention will be explained by way of example with reference to the following figures, in which.

Figure 1A:
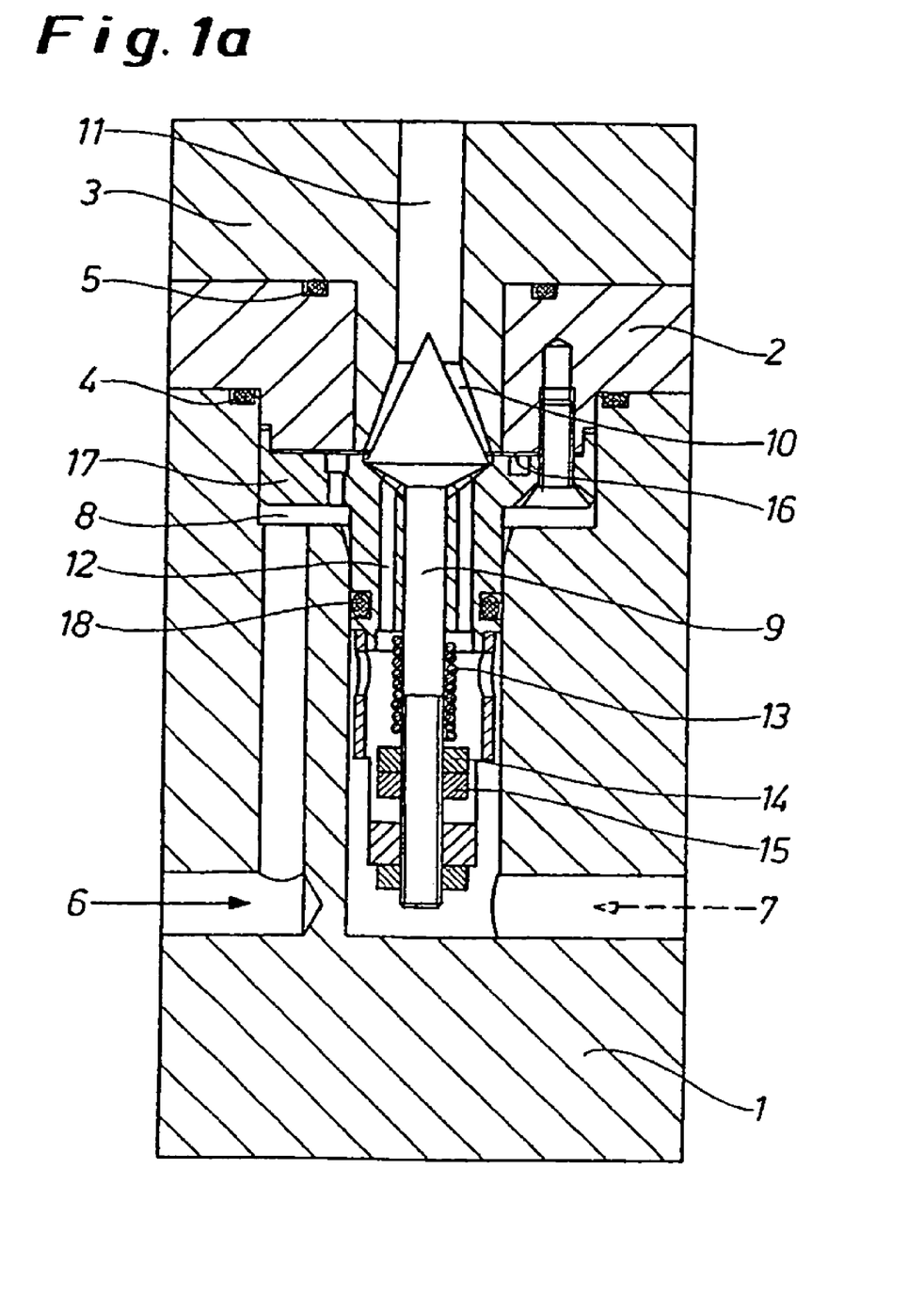
FIG. 1a shows a micromixer according to the invention, in particular a valve mixer, with a non-return valve in longitudinal section.

FIG. 1a represents a valve mixer according to the invention in a longitudinal section. The valve mixer consists of a base body 1, a middle part 2 and a cover 3. These three elements are externally sealed by two O-rings 4, 5. The first O-ring 4 is arranged between the base body 1 and the middle part 2, and the second O-ring 5 lies between the middle part 2 and the cover 3. The two sub-flows 6, 7 enter the base body 1 from the left and from the right. They are respectively indicated by horizontally extending black arrows. The first sub-flow 6 is fed upward in the left-hand region of the base body 1 through a bore, which opens into an annular channel 8 for the first sub-flow 6. From the annular channel 8, the first sub-flow 6 enters a mixing and reaction zone 10 just above a valve plunger 9. The second sub-flow 7 is fed centrally through the micromixer. It flows around the valve plunger 9 and is delivered via a plurality of bores 12 to the lower side of the head of the valve plunger 9, from where it enters the mixing and reaction zone 10. The reaction mixture, consisting of the first sub-flow 6 and the second sub-flow 7, is discharged via an outlet channel 11. The valve plunger 9, the mixing and reaction zone 10 and the outlet channel 11 are designed rotationally symmetrically. The force necessary to displace the valve plunger 9 upward is established by adjusting a coil spring 13, a nut 14 and a counter-nut 15. This force must be applied by the pressure difference which exists between the pressure in the bores 12 for the second sub-flow 7 and the mixing and reaction zone 10. This pressure difference displaces the valve plunger 9 upward and frees the path for the second sub-flow 7 into the mixing and reaction zone 10. If a pressure drop occurs in the bores 12, or if the pressure increases greatly in the mixing and reaction zone 10 or in the outlet channel 11 owing to deposits and clogging, then the valve plunger 9 is pressed downward against the valve body 17 in order to prevent reflux flow from the mixing and reaction zone 10 into the supply region for the second sub-flow 7. The micromixer is thus equipped with a reflux barrier in the form of the non-return valve for the second sub-flow 7. The sealing effect can be further improved if an elastomer seal (not shown here) is fitted between the valve plunger 9 and the valve body 17. The valve body 17 is sealed against the base body 1 by an O-ring 18, so as to prevent mixing of the two sub-flows 6, 7 outside the mixing and reaction zone 10. Between the valve body 17 and the middle part 2 of the micromixer, there is a flat spacer disk 16 which is designed with various thicknesses, for example with a thickness of between 20 and 5000 µm. Varying the disk thickness of spacer disk 16 changes the width of the gap between the valve body 17 and the middle part 2, from which the first sub-flow 6 flows into the mixing and reaction zone 10.

Figure 1B:
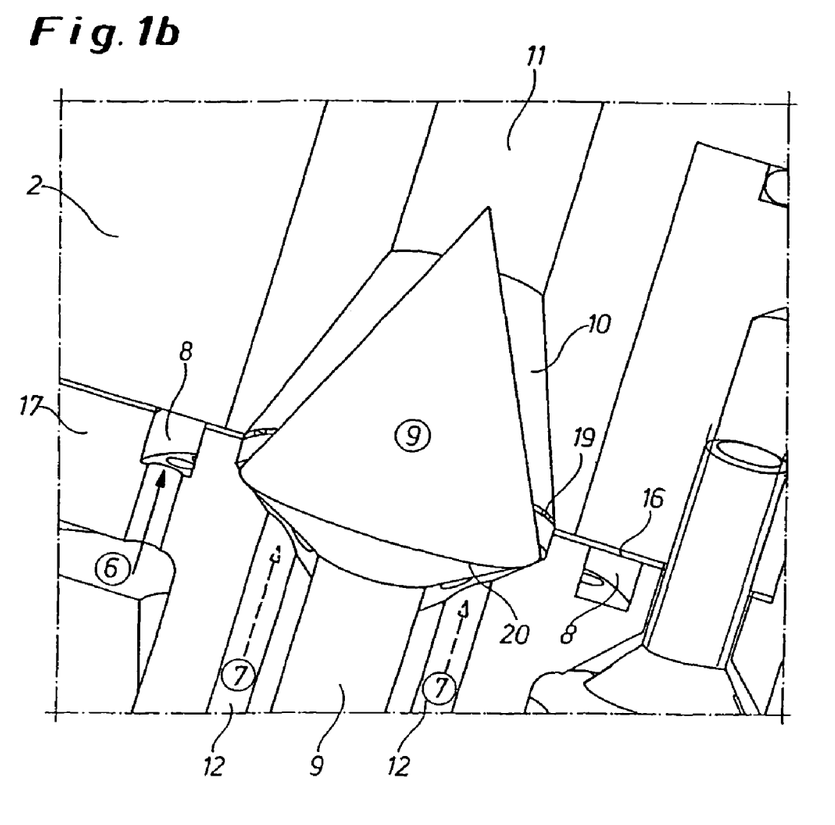
FIG. 1b shows an enlarged view of the micromixer in FIG. 1a in the vicinity of the mixing and reaction zone

FIG. 1b represents an enlarged view of the vicinity of the mixing and reaction zone 10 of the micromixer in FIG. 1a. The guiding of the two sub-flows 6, 7 can be seen particularly clearly here. The first sub-flow 6 passes from the annular channel 8 via a first entry gap 19, the width of which is determined by the spacer disk 16, into the mixing and reaction zone 10. Owing to the uniform thickness of the first entry gap 19, the first sub-flow 6 flows out of the valve body 17 as a continuous film. Behind this, the first sub-flow 6 strikes of the second sub-flow 7 likewise emerging as a continuous and uniform film. The second sub-flow 7 emerges from a second entry gap 20 between the valve plunger 9 and the valve body 17. The two sub-flows 6, 7 formed as films consequently flow mutually parallel through the mixing and reaction zone 10 to the outlet channel 11. An improvement of the mixing quality is achieved when the spacer disk 16 is microstructured.

Figure 1C:
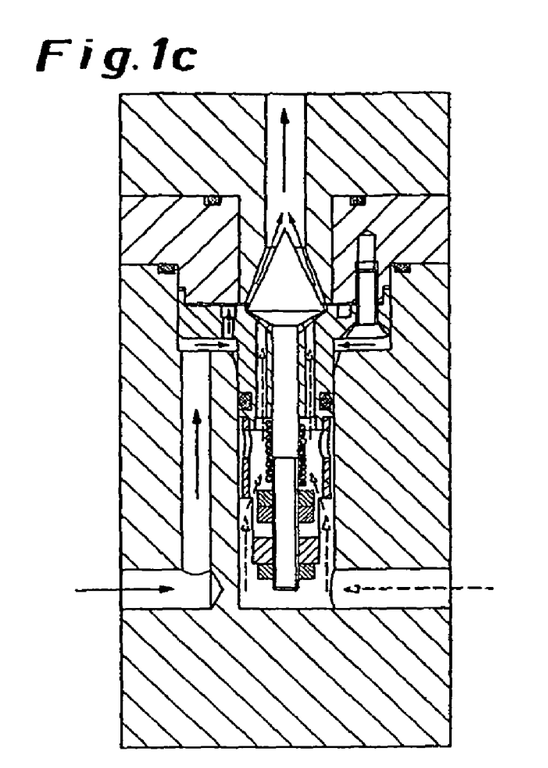
FIG. 1c shows the flow paths in the micromixer of FIG. 1a, FIG. 1d shows the flow paths in the enlarged view of FIG. 1b.
Figure 1D:
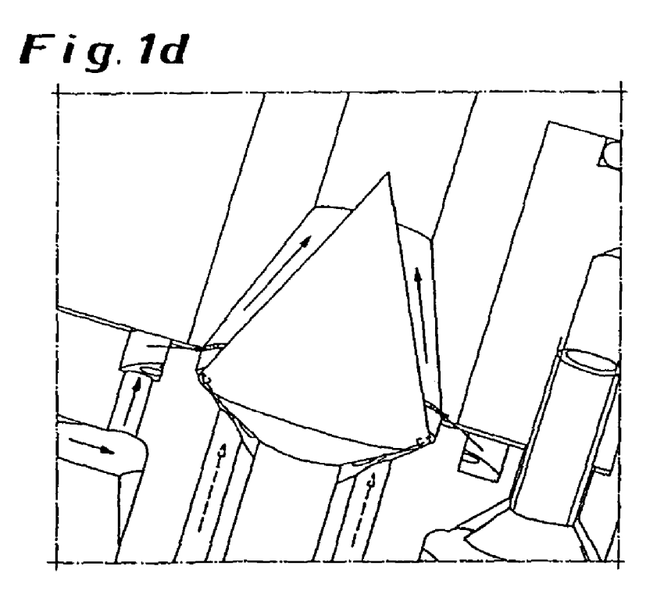

FIGS. 1c and 1d respectively depict the flow paths in FIGS. 1a and 1b. Reference numerals have been omitted. The flow paths are respectively represented by the black arrows.

Figure 2A:
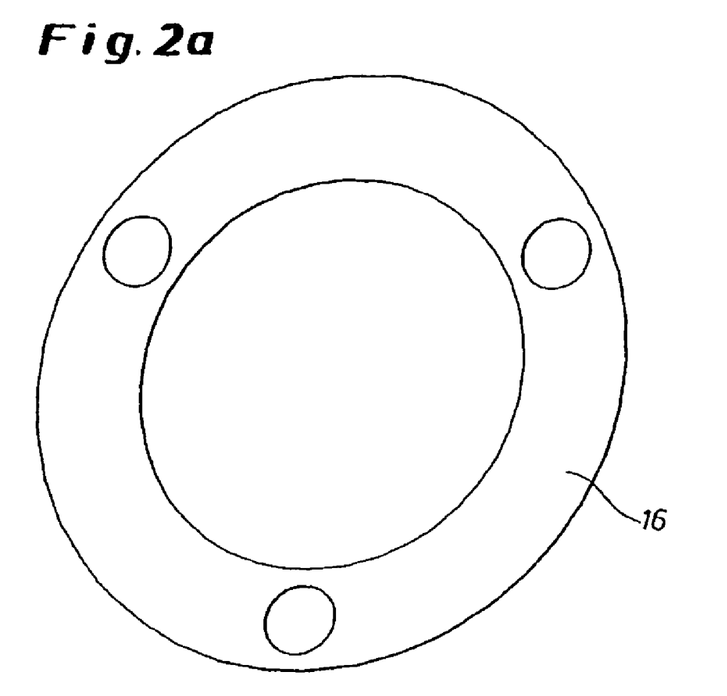
FIG. 2a shows a spacer disk for adjusting the height of the entry gap for the first sub-flow.
Figure 2B:
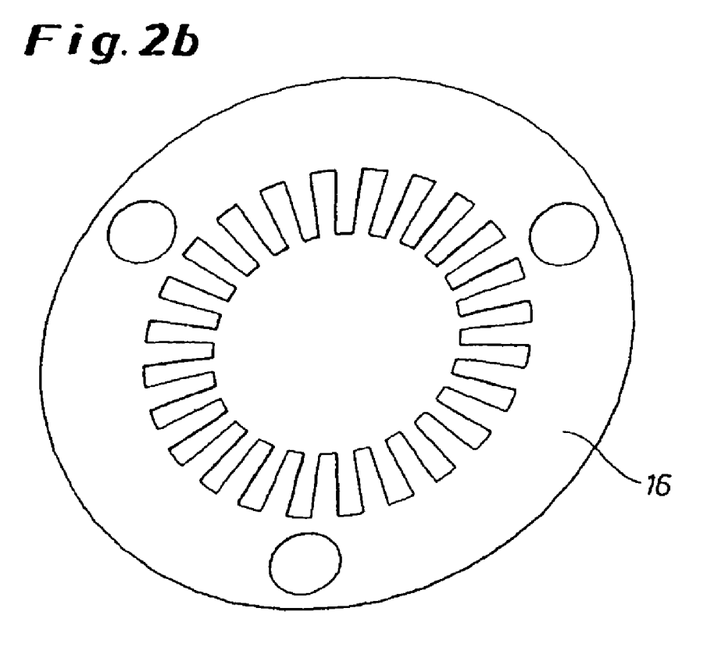
FIG. 2b shows a spacer disk with a microstructured configuration.

FIGS. 2a and 2b' respectively represent spacer disks 16 such as those used for adjusting the height of the first entry gap 19 between the valve body 17 and the middle part 2 for the first sub-flow 6. The spacer disk 16 of FIG. 2b differs from that in FIG. 2a in that it additionally comprises a microstructured configuration in the region of the first entry gap 19 for the first sub-flow 6. An improvement of the mixing of the two sub-flows 6, 7 can be achieved by the spacer disk 16 in FIG. 2b, since the continuous film of the first sub-flow 6 is decomposed into a plurality of individual streams and the speed of these individual streams at the first entry gap 19 is significantly increased, so that the streams enter the second sub-flow 7 and are enclosed by it. This utilizes the advantages of microtechnology for generating small fluid lamellae, without deposits and clogging of the microstructures occurring.

Figure 3A:
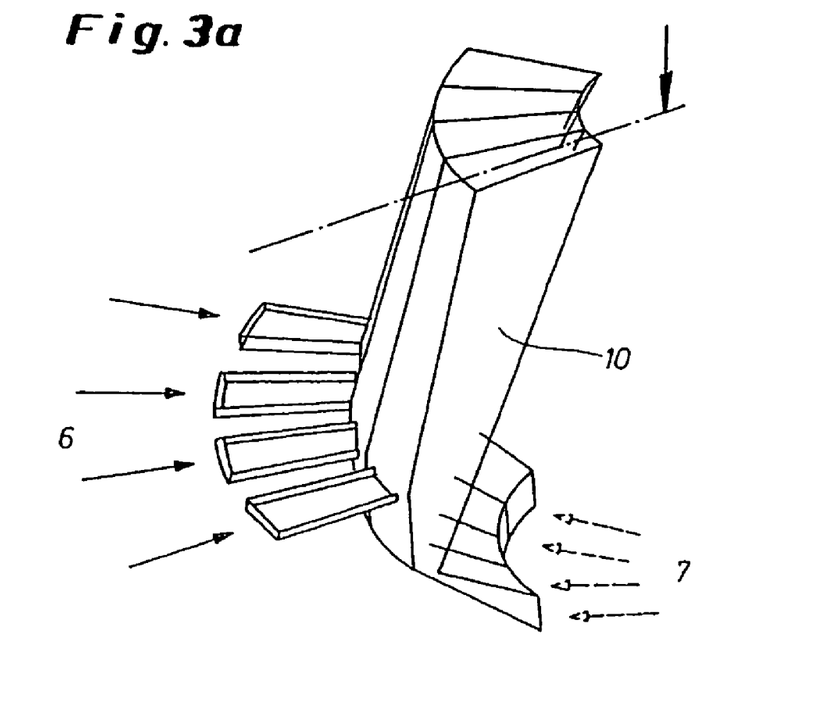
FIG. 3a shows a perspective view of the mixing and reaction zone of the micromixer with a non-return valve.
Figure 3B:
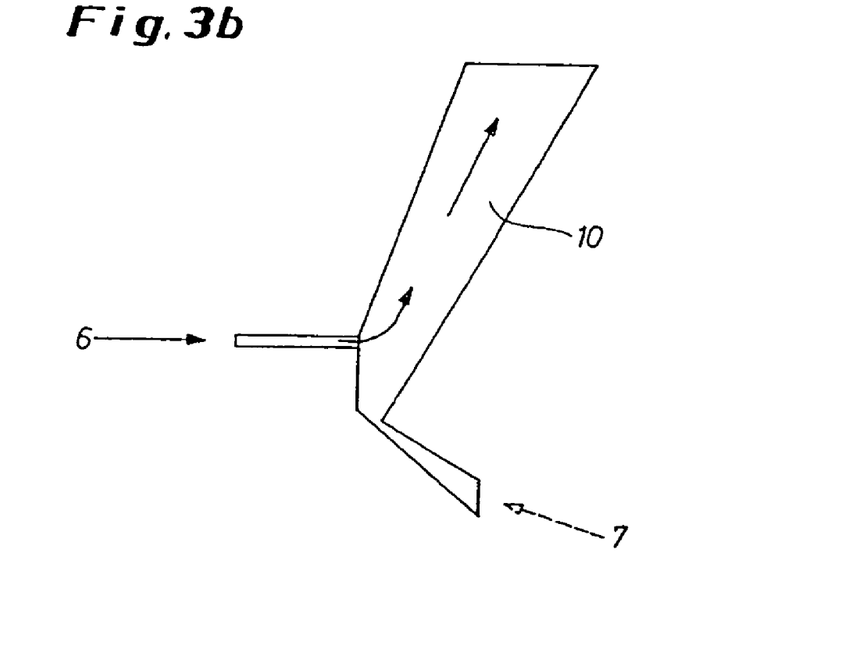
FIG. 3b shows a cross section through the mixing and reaction zone in FIG. 3a, FIG. 4 shows a longitudinal section through a valve plunger with a microstructured configuration of the surface, with an enlarged view in the vicinity of the wall.
Figure 4:
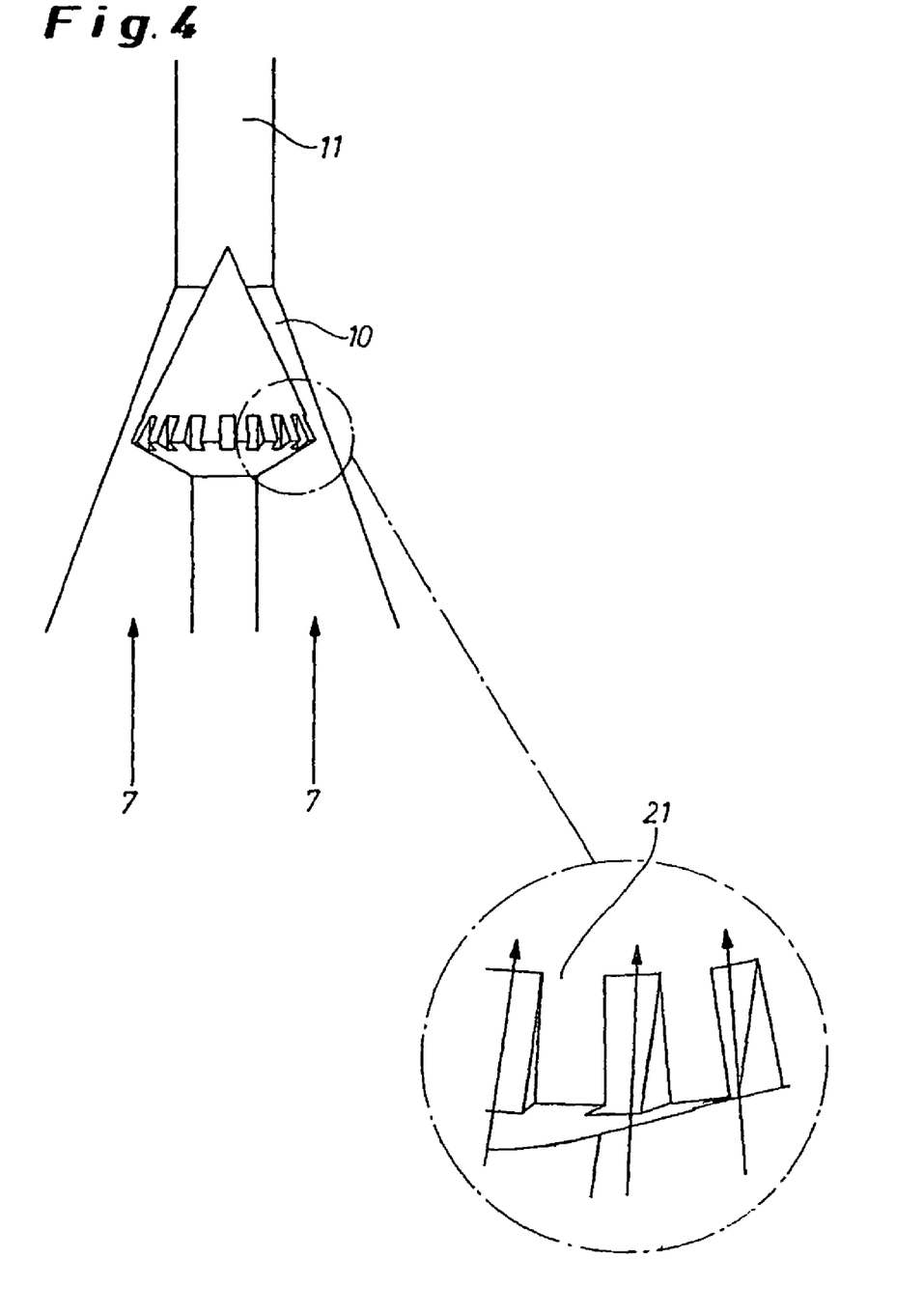

FIGS. 3a and 3b represent flow paths in the mixing and reaction zone 10. FIG. 3a is a perspective view of the mixing and reaction zone 10, a spacer disk 16 according to FIG. 2b having been used. The first sub-flow is indicated by black arrows 6, and the second sub-flow 7 is represented by white arrows. It can be seen that the first sub-flow 6 has been decomposed into a plurality of individual streams, which are respectively enclosed by the second sub-flow 7. FIG. 3b depicts a cross section through the mixing and reaction zone 10 of FIG. 3a with the corresponding flow paths of the first sub-flow 6 and the second sub-flow 7.

FIG. 4 represents a valve plunger 9 with a structured microsurface 21. The structured microsurface 21 is circled and shown enlarged in a circle on the right. The structured microsurface 21 divides the second sub-flow 7, otherwise emerging from the second entry gap 20 as a closed fluid film between the valve plunger 9 and the valve body 17, into a plurality of individual streams. The structures of the structured microsurface 21 are preferably between 50 and 3000 μm high, and they are arranged in the mixing and reaction zone 10 so that the bars bear on the wall when the valve plunger 9 is closed, so that the second sub-flow 7 is actually distributed into separate individual streams. A field with very high velocity gradients, as measured over the flow cross section of the second sub-flow 7, is thereby generated. This favors mixing of the first sub-flow 6 with the second sub-flow 7.

Figure 5A:
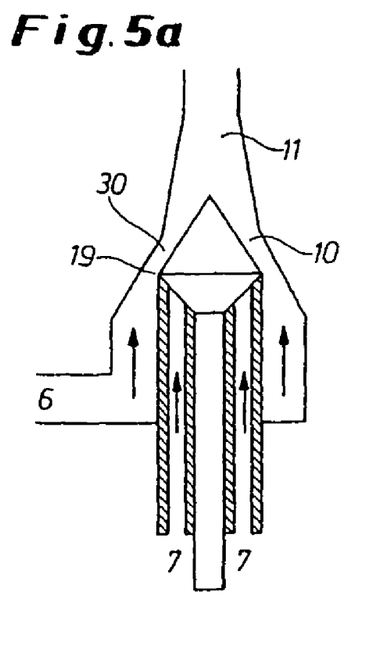
FIG. 5a shows a longitudinal section through a valve mixer with a narrow first entry gap and a closed non-return valve.
Figure 5B:
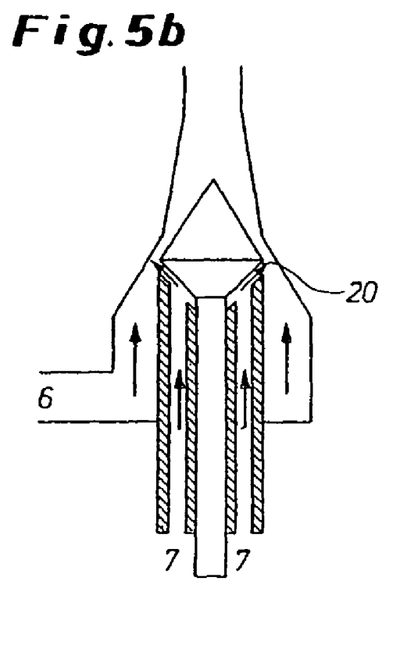
FIG. 5b shows a longitudinal section through the valve mixer of FIG. 5a with an opened non-return valve.
Figure 5C:
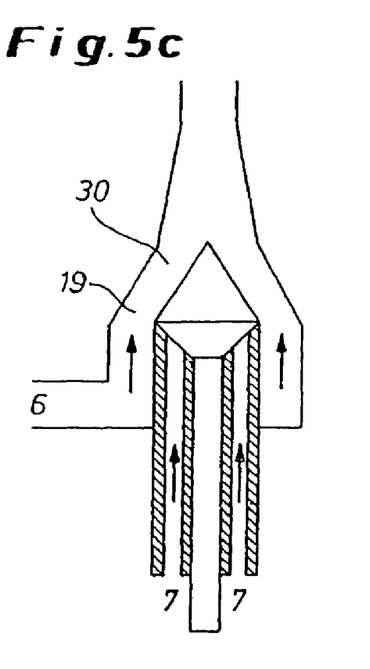
FIG. 5c shows a longitudinal section through a valve mixer with a wide first entry gap and a closed non-return valve.
Figure 5D:
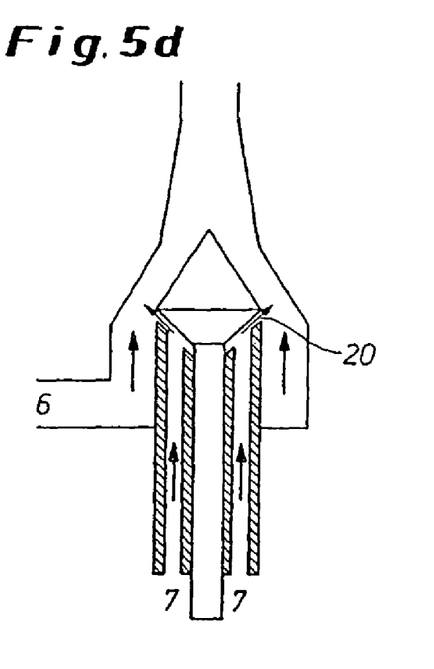
FIG. 5d shows a longitudinal section through the valve mixer of FIG. 5c with an opened non-return valve.

FIGS. 5a to 5d respectively represent a longitudinal section through a micromixer with a non-return valve as the reflux barrier. FIGS. 5a and 5b show a micromixer with a narrow first entry gap 19. In FIG. 5a the non-return valve is closed, and in FIG. 5b the non-return valve is opened and frees a second entry gap 20 for the second sub-flow 7. FIGS. 5c and 5d represent a micromixer with a wide first entry gap 19. In FIG. 5c the non-return valve is closed, and in FIG. 5d the non-return valve is opened and frees a second entry gap 20 for the second sub-flow 7. Owing to the narrow first entry gap 19 in FIG. 5b, the first sub-flow 6 experiences a much higher velocity than in the case of FIG. 5d with a wide first entry gap 19. Via a screw thread or a comparable external instrument, it is possible to vary the width of the first entry gap 19 and therefore also the width of the gap 30, in which the two sub-flows 6, 7 converge, which corresponds in its downstream extension to the mixing and reaction zone.

Figure 6A:
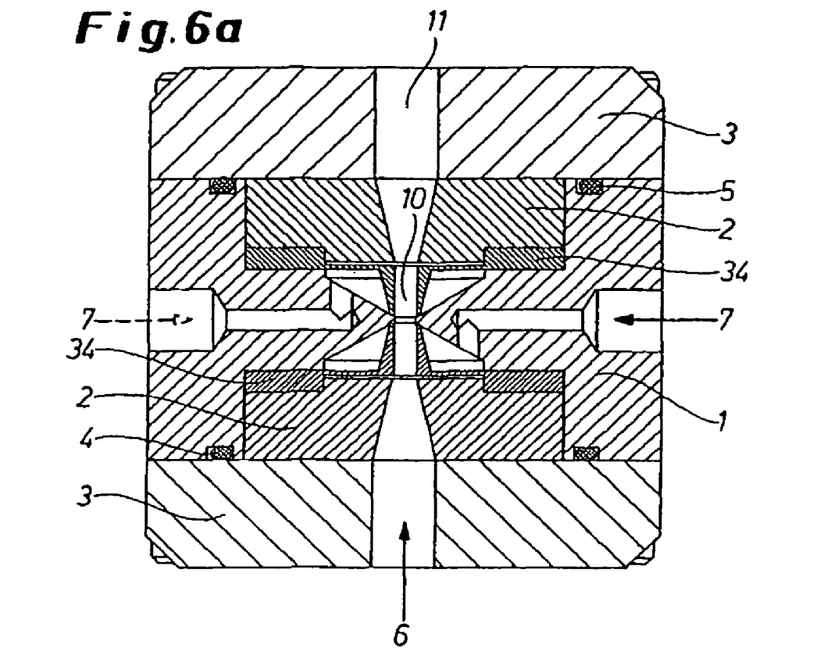
FIG. 6a shows a micromixer according to the invention with a membrane arrangement in longitudinal section.

FIG. 6a shows a micromixer according to the invention with a membrane body 34 as a reflux barrier in longitudinal section. In this micromixer, three sub-flows 6, 7, 37 are mixed together. This micromixer also comprises a base body 1, a middle part 2 and a cover 3. The cover 3 consists of an upper half and a lower half, and the middle part 2 likewise consists of an upper part and a lower part. The second and third sub-flows 7, 37 are respectively delivered to the mixing and reaction zone 10 via a reflux barrier in the manner of a membrane body 34. Various materials may be envisaged for the membrane body 34. Via various wall thicknesses of the membrane body 34 and different elasticity of the material, it is possible to adjust the required opening force to be applied by the pressure difference. This is comparable to the adjustment in the micromixer of FIG. 1a with a non-return valve, which is carried out via the coil spring 13, the nut 14 and the counternut 15. In this embodiment of the micromixer with a membrane body 34, either only one further sub-flow or both further sub-flows 7, 37 can be admixed to the first sub-flow 6. It is likewise conceivable for the first sub-flow 6 to entrain particles with it. The particles can pass unimpeded through the microstructure, since the micromixer has minimum dimensions in the range of between 500 and 3,000 μm.

Figure 6B:
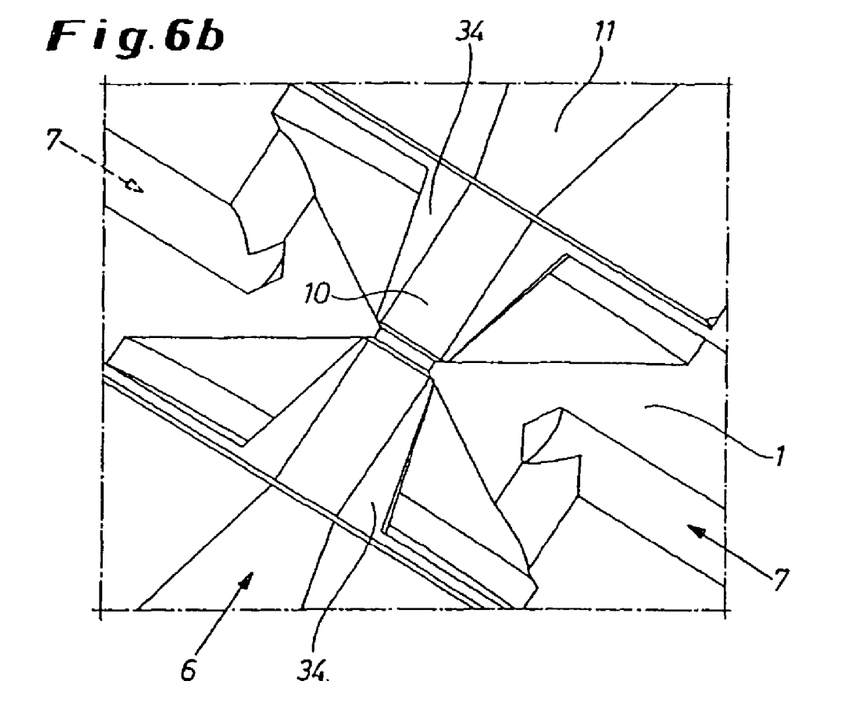
FIG. 6b shows an enlarged view of the micromixer in FIG. 6a in the vicinity of the mixing and reaction zone.

FIG. 6b represents an enlarged view of FIG. 6a in the vicinity of the mixing and reaction zone 10.

Figure 6C:
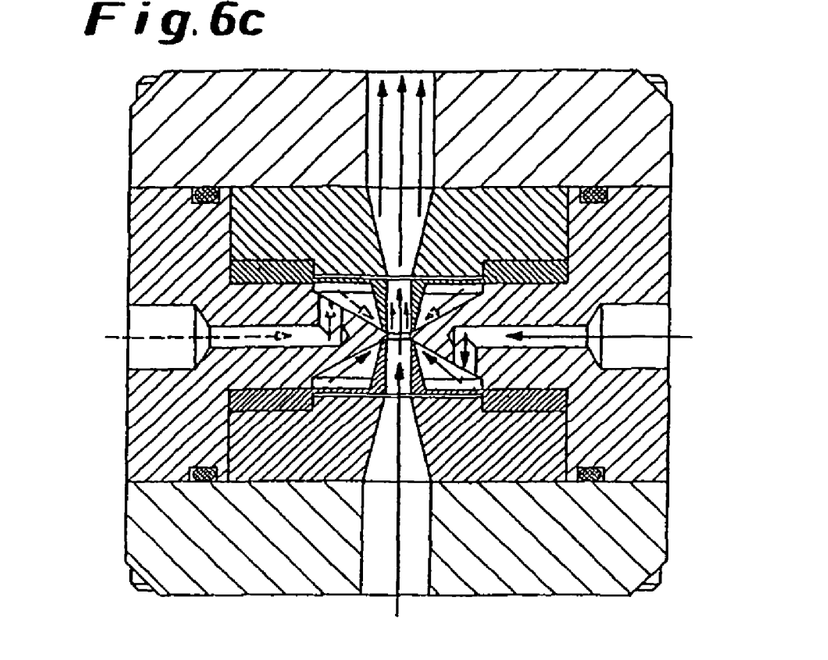
FIG. 6c shows the flow paths in the micromixer of FIG. 6b.
Figure 6D:
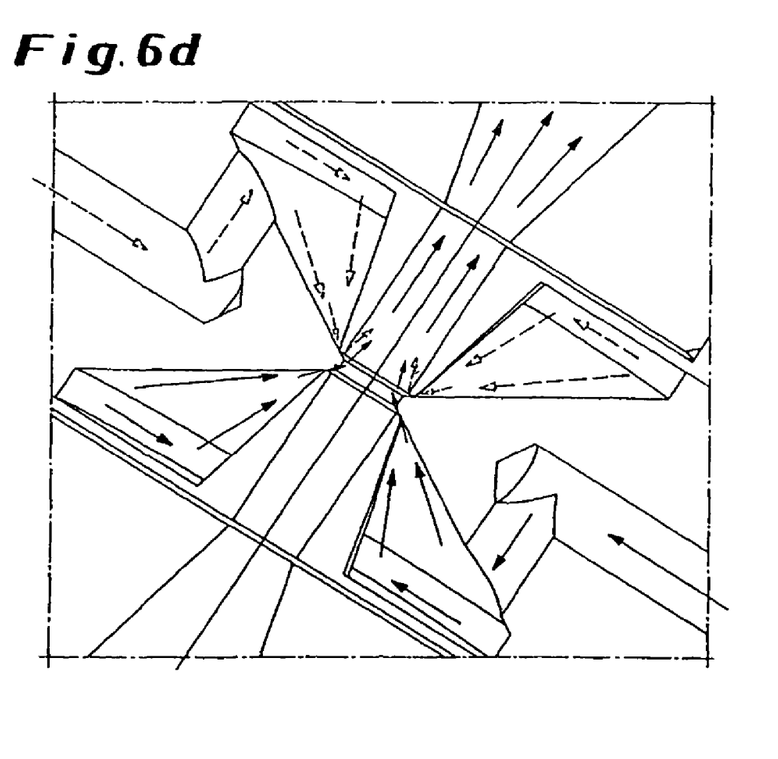
FIG. 6d shows the flow paths in the enlarged view of FIG. 6b.

FIGS. 6c and 6d depict the flow paths of FIG. 6a and FIG. 6b. Reference numerals have been omitted.

Figure 7:
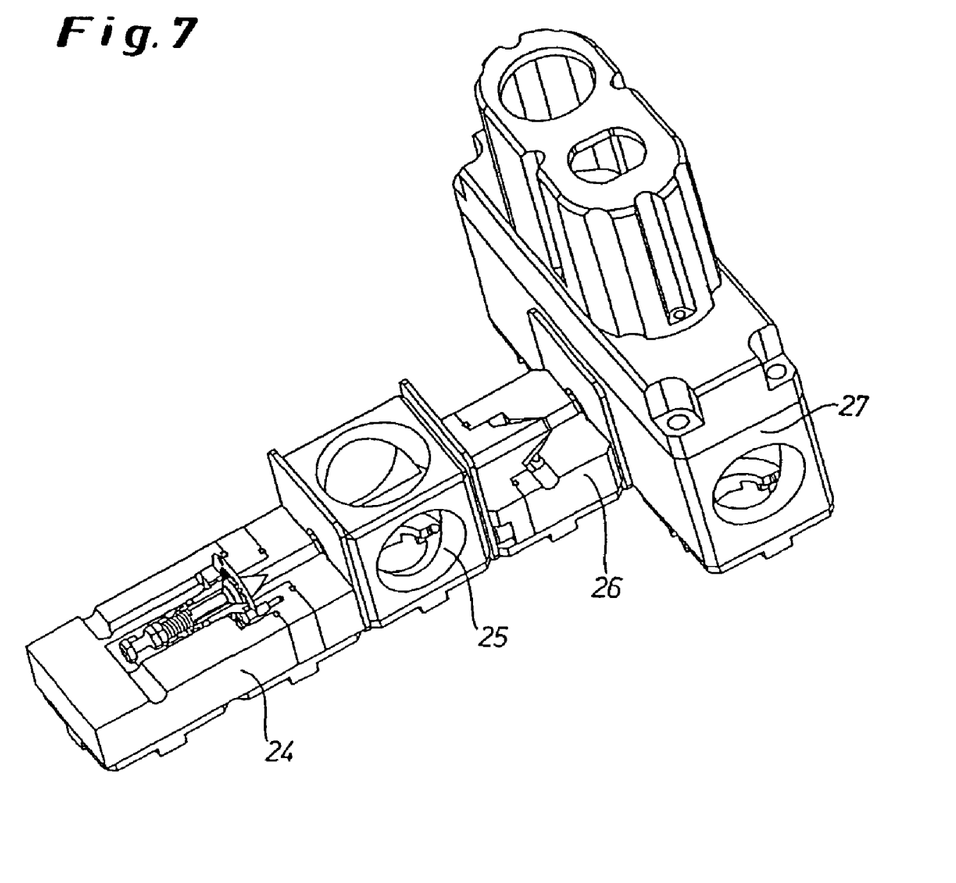
FIG. 7 shows a valve mixer according to the invention in combination with a further dosing point and a heated outlet channel.

FIG. 7 represents a module 24 designed as a valve mixer, which is combined together with a further dosing point 26 and an electrical heating module 27 to form an integrated component. Between the module 24 designed as a valve mixer and the further dosing point 26, an insulation module 25 is provided for thermal decoupling of these neighboring components.

FIG. 8 represents an advantageous embodiment of the valve mixer with an annularly coaxial arrangement of the entry gaps 19, 20, in which the reflux barrier is formed in the region of the outer of the two entry gaps. The reflux barrier is produced by an axially mobile valve ring 41, which is sealed against the housing 43 by a piston seal 42 and is pressed against the opposing edge of the entry gap 19 by a closing force action 45. When the force exerted on the valve ring by the pressure of the first sub-flow exceeds the closing force action, then the entry gap 20 opens and the first sub-flow flows into the mixing and reaction zone 10.

FIG. 9 represents another advantageous embodiment of the valve mixer with an annularly coaxial arrangement of the entry gaps 19, 20, in which a reflux barrier is formed both in the region of the first entry gap and in the region of the second entry gap. The functional principles of the valve mixer embodiments represented in FIGS. 5 and 8 are advantageously combined together in this case.

FIG. 10 shows a likewise advantageous embodiment of the valve mixer, which is distinguished from the embodiment represented in FIG. 9 in that third sub-flow 37 is supplied to the mixing and reaction zone 10 through a further annular entry gap 38, which is arranged between the entry gap 19 for the first sub-flow and the entry gap 20 for the second sub-flow.

Figure 11:
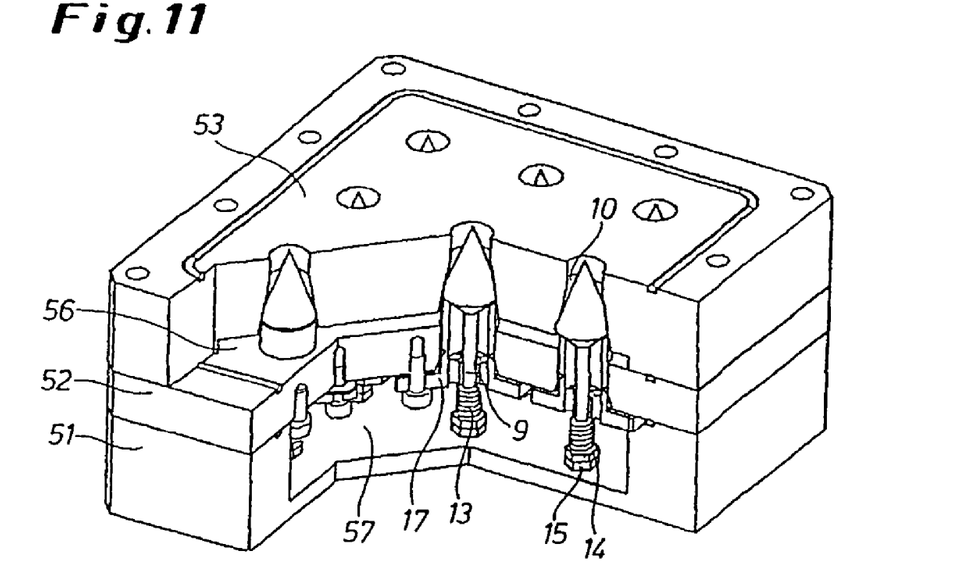
FIG. 11 shows a valve mixer for large volume flows, which is designed as a parallel arrangement of a plurality of identical valve mixer units in a common housing with a common supply of the sub-flows as well as a common discharge of the mixing product.

FIG. 11 represents a parallel arrangement of a plurality of valve mixer units according to the invention in a common housing (51-53) with a common supply of the sub-flows, which can advantageously be used for mixing larger volume flows. Supply channels for the first sub-flow (56) and the second sub-flow (57) are arranged in two planes lying above each other in this embodiment. The opening pressure of the non-return valve is individually variable in each of the parallel-operated valve mixer units, in order to be able to adjust a uniform volume flow ratio of the sub-flows at all the mixer units. The mixing product leaves the individual mixer units in a common outlet channel, which is arranged in direct continuation above the module represented in FIG. 11.

LIST OF REFERENCES 1 base body
2 middle part 3 cover
4 first O-ring
5 second O-ring
6 first sub-flow
7 second sub-flow
8 ring channel for the first sub-flow
9 valve plunger
10 mixing and reaction zone
11 outlet channel
12 bores in the valve body the second sub-flow
13 coil spring
14 nut
15 counter-nut
16 spacer disk
17 valve body
18 third O-ring
19 entry gap for the first sub-flow
20 entry gap for the second sub-flow
21 microstructured surface of the valve plunger
24 module designed as valve mixer
25 insulation module for thermal decoupling of neighboring components
26 further dosing point
27 electrical heating module
30 distance
34 membrane body
37 third sub-flow
38 entry gap for third sub-flow
40 central cone
41 valve ring
42 piston seal
43 housing
45 closing force action on valve ring
46 closing force action on valve plunger
51 common base body
52 common middle part
53 common outlet plate
56 common supply channel for first sub-flow
57 common supply channel for second sub-flow

The invention claimed is:

1. A micromixer for mixing at least two fluids which react to form precipitates or suspensions, having a first channel for supplying a first sub-flow (6) and having a second channel for supplying a second sub-flow (7), which open in flat entry gaps (19, 20) into a mixing and reaction zone (10) and leave the mixing and reaction zone (10) via an outlet channel (11), wherein a reflux barrier is arranged between the mixing and reaction zone (10) and at least one channel for supplying a sub-flow (6, 7, 37) and wherein the entry gaps (19, 20) are bounded by microstructured components (16, 9), which contribute to dividing the sub-flows (6, 7, 37) into individual sub-streams.

2. The micromixer as claimed in claim 1, wherein the reflux barrier is designed as a non-return valve.

3. The micromixer as claimed in claim 2, wherein the prestress of the non-return valve is provided by mechanical means (13, 14, 15).

4. The micromixer as claimed in claim 2, wherein the non-return valve is electrically, pneumatically, hydraulically or electromagnetically drivable.

5. The micromixer as claimed in claim 1, wherein the reflux barrier is designed as a membrane arrangement.

6. The micromixer as claimed in claim 1, wherein deposits are cleaned from the reflux barrier in the course of operation by cleaning pins, which insert into the opening uncovered by the reflux barrier during each opening and closing process and are essentially designed with a needle shape.

7. The micromixer as claimed in claim 1, wherein entry gaps (19, 20) for the sub-flows (6, 7, 37) are designed as narrow annular gaps, so that the sub-flows (6, 7, 37) meet each other as thin film layers.

8. The micromixer as claimed in claim 1, wherein the outlet channel (11) has a smooth and widening geometry.

9. The micromixer as claimed in claim 1, wherein a feed for an envelope stream, which encloses the mixed sub-flows (6, 7, 37) when they emerge, is provided in the outlet channel (11).

10. The micromixer as claimed in claim 1, wherein the response pressure and/or the opening behavior of the reflux barrier, the width of at least one of the inlet gaps and/or the characteristic dimensions of the mixing and reaction zone are externally adjustable by mechanical, hydraulic, pneumatic, electrical or electromagnetic means and/or are automatically varied as control variables of an outer or inner control loop.

11. An apparatus comprising two or more micromixers of claim 1 arranged in a common housing with common supplies of the sub-flows and a common outlet channel, so that they can be operated in parallel.

12. A method for carrying out precipitation and/or crystallization reactions, the preparation of nanoparticles, carbon nanotubes, fullerenes or particles/nanoparticles having a plurality of layers of different substances arranged in a concentric sequence, which comprises carrying out same in the micromixer of claim 1.

* * * * *